Oct. 25, 1932.   I. D. PERRY   1,884,829

DOOR BUMPER AND THE LIKE

Original Filed April 2, 1931

Inventor:
Ira D. Perry

Patented Oct. 25, 1932

1,884,829

UNITED STATES PATENT OFFICE

IRA D. PERRY, OF CHICAGO, ILLINOIS, ASSIGNOR TO EDNA L. MEYER, OF ROCKFORD, ILLINOIS

DOOR BUMPER AND THE LIKE

Original application filed April 2, 1931, Serial No. 527,129. Divided and this application filed September 16, 1931. Serial No. 563,055.

This invention has to do with improvements in door bumpers for automobile bodies and the like. The invention herein disclosed has reference particularly to improvements in door bumpers for vehicles such as automobiles, etc., but the features of invention are not limited to this or any other particular class of service. However, in view of the fact that these door bumpers are generally used in connection with the doors of such vehicles, I have illustrated and will describe this particular application of the invention, but in so doing, I wish it clearly understood that I do not intend thereby to limit myself except as I may do so in the claims.

The doors of vehicles such as automobiles, etc., are usually provided with a contacting edge portion which moves into or towards a shoulder or ledge formed along a permanent portion of the structure of the vehicle, such as the door pillar thereof. This door pillar is usually provided with a companion ledge, the pillar having a ledge surface against or towards which the companion edge surface portion of the door approaches when the door is shut. This surface of the pillar faces in the direction of door closing movement. The pillar is also provided with another surface approximately at right angles to the surface just referred to, and lying substantially parallel to the direction of door closing movement.

One feature of the present invention relates to the provision of a door bumper for use in connection with the pillar above referred to, which door bumper is so arranged and supported in or on the pillar that there is provided a relatively large and rigid surface at the back side of the door stop so as to enable the same to very effectively resist the pressure and shock incident to the door closing operation. In this connection it is an object of the invention to so arrange and support the resilient block of the door bumper that it is supported with a comparatively large flat facial supporting surface on the pillar. This is to be clearly distinguished from previous arrangements in which the resilient block has only been supported and backed by a relatively narrow or sharp edge or line of support, since in the latter case the pressure and shock incident to the door closing operation very quickly result in cutting the material of the door bumper by said sharp edge support.

In connection with the foregoing, it is a further feature of the invention to provide arrangements whereby the resilient block will be very effectively attached and connected to the pillar at or adjacent to the position of face contact support aforesaid, so that not only will the resilient block be able to properly and effectively receive and resist the severe forces incident to the shock of closing the door, but also the resilient block will be properly held in place against rebounds or sudden deflections created either at the instant of opening or the instant of closing the door.

In connection with the foregoing, it is a further object of the invention to provide means whereby the resilient block may be readily attached and permanently connected to the pillar and effectively held in place thereon without the need of any additional or supplemental attaching devices other than the resilient block and the form of the door pillar itself. In this connection it is an object of the invention to provide arrangements whereby the resilient block may be "snapped" or "buttoned" into place on the door pillar, and the parts being relatively so formed that the resilient block may be forced home with respect to suitable receiving openings of the pillar and will thereupon lock itself to the pillar.

A further feature of the invention relates to the provision of door bumper constructions which are especially well adapted and intended for permanent attachment to the door pillar in the form of standard equipment as distinguished from so-called replacement equipment. In this connection, the door bumpers herein disclosed are not intended for removal from the pillar or adjustment thereon after once being set into place, and in some cases the forcible removal of the door bumper will result in injuring or destroying it.

A further feature of the invention relates to the provision of door bumpers for the purpose specified which are so related to the pillar that the resilient blocks present a relatively large surface facing in the direction of the door closing movement, substantially all of which surface overlies or is directly supported by the solid structure of the door pillar so that a most effective shock and pressure receiving arrangement is established.

Other objects are to provide very simple forms of the resilient blocks, and to provide for the attachment thereof to the pillar by very simple recesses or sockets formed directly in the metal of the pillar itself.

This application is a division of my co-pending application, Serial No. 527,129, which was filed April 2, 1931.

In the drawing

In each of the figures, the door pillar in its entirety is designated by the numeral 10. It is made of sheet metal so folded as to provide a ledge 11 which faces in the direction of door closing movement, and the door pillar is also usually provided with inner and outer flanges 12 and 13 respectively which lie parallel to the direction of door closing movement.

The edge portion of the door of conventional form is provided with a lip or edge portion which moves toward the ledge 11 in the door closing movement and the edge portion of the door is also usually provided with a flanged portion which lies parallel to the flange 12 of the door pillar and moves past same during the door closing movement.

In each of the constructions herein disclosed I have provided the ledge 11 herein disclosed with a pair of openings which are separated from each other lengthwise of the door pillar a substantial distance but between which openings the ledge of the pillar is solid or uncut or unperforated so as to establish a door bumper supporting surface of substantial size between said openings. The openings referred to are for the purpose of receiving suitable lugs or connecting devices on the door bumper itself so as to hold said bumper in place on the pillar. The continuous ledge portion between said openings serves to establish a door bumper supporting surface of substantial size and which is amply capable of supporting the bumper against heavy shocks and impact forces incident to the slamming of the door shut, etc. At the same time this door bumper supporting surface is of the full width of the ledge measured across the door pillar as distinguished from a relatively narrow surface such as is established by the exposed edge of a thickness of sheet metal.

In connection with the foregoing feature in the construction of the door pillar, the provision of lugs or other attaching portions directly formed as portions of the door bumper itself, makes it possible to secure the door bumper in place without the necessity of using any other or extraneous connecting or attaching devices.

Figure 1:
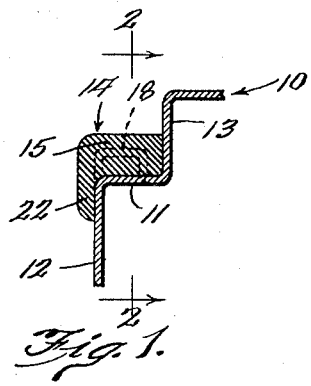
Figure 1 shows a cross section through a portion of the door pillar of conventional form at the position of the ledge thereof, having applied thereto a door bumper embodying the features of the present invention, and Figure 1 may be considered as a section on the line 1—1 of Figure 2 looking in the direction of the arrows.
Figure 2:
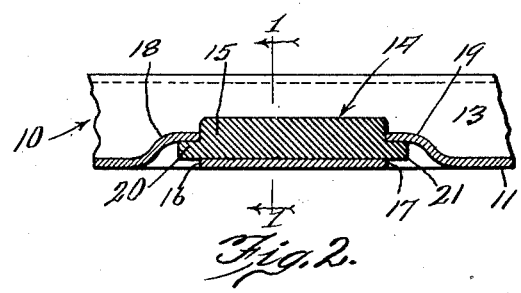
Figure 2 shows a longitudinal section on the line 2—2 of Figure 1 looking in the direction of the arrows.

Referring again to the drawing, in the form of Figures 1 and 2 the door bumper 14 includes a body portion 15 of rubber or other suitable resilient material which is laid directly against the surface of the ledge 11 between a pair of longitudinally separated openings 16 and 17, formed in said ledge, so that the door bumper occupies the entire distance or space between said openings. In the arrangement of Figures 1 and 2 the openings 16 and 17 are formed by striking up the metal of the ledge 11 in the form of a pair of ears 18 and 19 so that the said openings face endwise of the door pillar and the ears are above the surface of the ledge 11.

The end portions of the door bumper 14 are provided with outwardly reaching lugs 20 and 21 which may be forced or hooked beneath the ears 11 and through the openings 16 and 17, such operation being possible by slightly springing the resilient block out of shape during the insertion operation.

The door bumper of Figures 1 and 2 is also provided with a downwardly extending lip or ear 22 which somewhat overlies the outer edge portion of the inner edge 12 of the door pillar. This serves to give the device a more finished appearance and at the same time tends to stiffen the resilient block against bulging upwardly away from the ledge 11.

Figure 3:
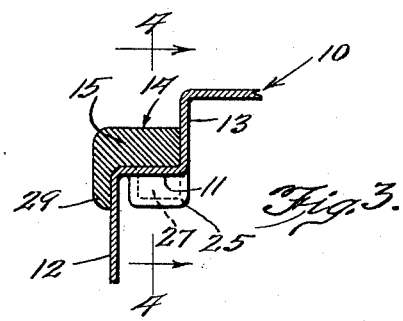
Figure 3 shows a view similar to that of Figure 1 but illustrating a modified construction in which the openings in the ledge of the door pillar are flanged downwardly instead of upwardly and Figure 3 may be considered as a section on the line 3—3 of Figure 4, looking in the direction of the arrows.
Figure 4:
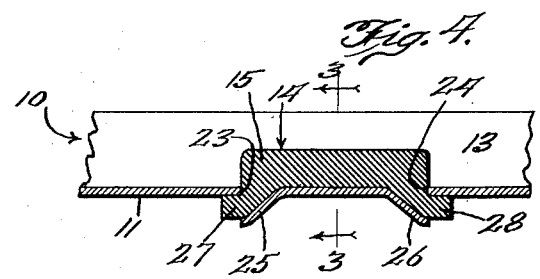
Figure 4 is a longitudinal section on the line 4—4 of Figure 3 looking in the direction of the arrows.

In the construction of Figures 3 and 4 the openings 23 and 24 are formed in the ledge 11 of the door pillar by striking the ears 25 and 26 downwardly below said ledge instead of upwardly above the same as in the previous arrangement. In the present case also the end portions of the resilient block are provided with downwardly reaching endwise projecting lugs 27 and 28 which are extended through the holes 23 and 24 and are hooked against the lower or inner surface of ledge 11 adjacent to the position of said holes such result being readily accomplished by bending or deflecting the resilient block during the inserting operation. It will also be noted that the ears 25 and 26 serve to establish supporting surfaces for the end portions of the resilient block so that said block is supported throughout its entire length between the positions of the lugs 27 and 28.

In the present case also the resilient block is provided with a downwardly extending lip or ear 29 which slightly overlies the outer portion of the flange 12 adjacent to this position of the lug 11.

Figures 6, 7:
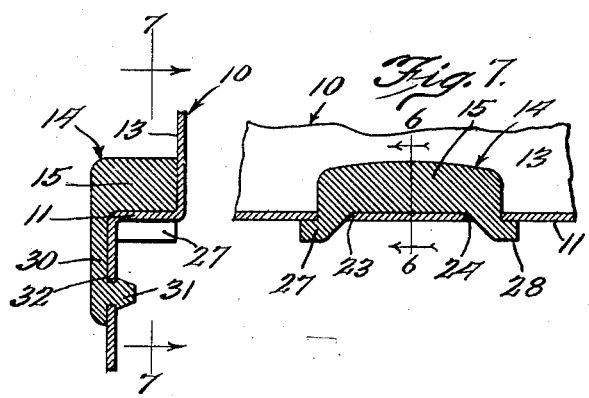
Figure 6 is a cross section on the line 6—6 of Figure 5 looking in the direction of the arrows.
Figure 7 is a longitudinal section on the line 7—7 of Figure 6 looking in the direction of the arrows.
Figure 5:
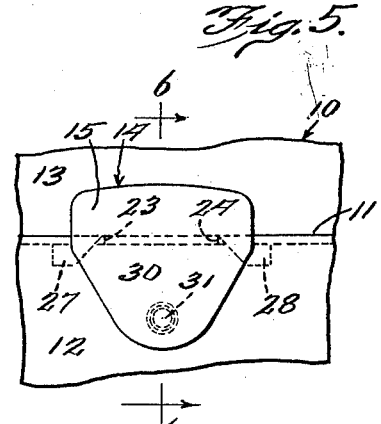
Figure 5 shows a face view of another form of construction similar to the one of Figures 3 and 4, but in the present case the door bumper is provided with a downwardly extending lug overlying one of the flanges of the door pillar in the direction of door closing movement.

The modified construction of Figures 5, 6, and 7 is somewhat similar to that of Figures 3 and 4. In the present case, however, the lip or flanged portion 30 of the resilient block is carried down over the flange 12 of the door pillar far enough to provide a button or fastener 31 which can be snapped through an opening 32 formed in the flange 12 at the proper point so as to afford still further support for the resilient block so as to hold the same in place on the door pillar.

The door bumper shown in Figures 5, 6, and 7 is readily set into place by bending or deflecting it sufficiently to allow the lugs 27 and 28 to be snapped or worked through the openings 23 and 24, whereupon the button 31 can be snapped through the opening of the flange 12 so as to complete the attaching operation. It will be noted that the button 31 is provided with an enlarged head which will effectively secure the same in place similarly to a glove buttoner.

While I have herein shown and described only certain embodiments or features of my present invention I do not intend to limit myself thereto except as I may do so in the claims.

I claim:

1. A door buffer device comprising a sheet metal pillar member formed to provide an impact ledge facing in the direction of door closing movement, and inwardly and outwardly extending side flanges connected with the edges of the ledge, and a bumper block of resilient material disposed on the ledge in abutment with the outwardly extending flange having an abutment portion above the plane of the ledge for engagement by a door and having a longitudinal lip projecting therefrom to overlie the side of the inwardly extending flange, said block seating on the ledge and having fastening lugs reaching endwise from opposite ends thereof, the sheet metal of the pillar member being suitably formed to provide openings in the ledge at opposite ends of the block for reception of said lugs so as to hold the block in place on the ledge, the said block by virtue of its resilience and the location and form of the lugs being arranged to have the lugs entered into the openings by suitably buckling the same endwise.

2. A door buffer device comprising a sheet metal pillar member formed to provide an impact ledge facing in the direction of door closing movement, and inwardly and outwardly extending side flanges connected with the edges of the ledge, and a bumper block of resilient material disposed on the ledge in abutment with the outwardly extending flange and having a longitudinal lip projecting therefrom to overlie the side of the inwardly extending flange, said block seating on the ledge and having fastening lugs reaching endwise from opposite ends thereof, the sheet metal of the pillar member being suitably formed to provide sockets struck out from the plane of the ledge, the walls of the sockets being integral with the wall of the ledge, and the sockets being open at one end for projection endwise therethrough of the lugs on the ends of the block, the said block by virtue of its resilience and the location and form of the lugs being arranged to have the lugs entered into the openings by suitably buckling the same endwise.

3. A door buffer device comprising a sheet metal member formed to provide an impact ledge facing in the direction of door closing movement, and a bumper block of resilient material disposed on the ledge and having an abutment portion above the plane of the ledge for engagement by a door, said block seating on the ledge and having fastening lugs reaching endwise from opposite ends thereof, the sheet metal of the pillar member being suitably formed to provide openings in the ledge at opposite ends of the block for reception of said lugs so as to hold the block in place on the ledge, the said block by virtue of its resilience and the location and form of the lugs being arranged to have the lugs entered into the openings by suitably buckling the same endwise.

4. A door buffer device comprising a sheet metal pillar member formed to provide an impact ledge facing in the direction of door closing movement, and a bumper block of resilient material disposed on the ledge, said block seating on the ledge and having fastening lugs reaching endwise from opposite ends thereof, the sheet metal of the pillar member being suitably formed to provide sockets struck out from the plane of the ledge, the walls of the sockets being integral with the wall of the ledge, and the sockets being open at one end for projection endwise therethrough of the lugs on the ends of the block, the said block by virtue of its resilience and the location and form of the lugs being arranged to have the lugs entered into the openings by suitably buckling the same endwise.

5. A door buffer device comprising a sheet metal pillar member formed to provide an impact ledge facing in the direction of door closing movement, and a bumper block of resilient material disposed on the ledge, said block seating on the ledge its full length and having fastening lugs reaching endwise from opposite ends thereof, the sheet metal of the pillar member being suitably formed to provide sockets struck inwardly from the plane of the ledge, the walls of said sockets being integral with the wall of the ledge, the sockets having communication with the ledge and opening in opposite directions to establish communication directly beneath the ledge, the block being formed at opposite ends to seat in the sockets with the lugs projecting endwise in opposite directions with respect to one another through the open ends of the sockets and engaging under the ledge to retain the block in place on the ledge, the block by virtue of its resilience and the location and form of the lugs being arranged to have the lugs entered into the openings by suitably buckling the same endwise.

6. A device as set forth in claim 3 wherein the pillar member is formed to provide an inwardly projecting flange connected with the edge of the ledge, and wherein the block disposed on the ledge has a lip projecting therefrom to overlie the side of said flange.

7. A device as set forth in claim 4 wherein the pillar member is formed to provide an inwardly projecting flange connected with the edge of the ledge, and wherein the block disposed on the ledge has a lip projecting therefrom to overlie the side of said flange.

8. A device as set forth in claim 5 wherein the pillar member is formed to provide an inwardly projecting flange connected with the edge of the ledge, and wherein the block disposed on the ledge has a lip projecting therefrom to overlie the side of said flange.

9. A device as set forth in claim 3 wherein the pillar member is formed to provide an inwardly projecting flange connected with the edge of the ledge, said inwardly projecting flange having an opening provided therein, and wherein the block disposed on the ledge has a lip projecting therefrom to overlie the side of said flange, the lip having means engaging in the opening to anchor the block to the pillar.

10. A device as set forth in claim 4 wherein the pillar member is formed to provide an inwardly projecting flange connected with the edge of the ledge, said inwardly projecting flange having an opening provided therein, and wherein the block disposed on the ledge has a lip projecting therefrom to overlie the side of said flange, the lip having means engaging in the opening to anchor the block to the pillar.

11. A device as set forth in claim 5 wherein the pillar member is formed to provide an inwardly projecting flange connected with the edge of the ledge, said inwardly projecting flange having an opening provided therein, and wherein the block disposed on the ledge has a lip projecting therefrom to overlie the side of said flange, the lip having means engaging in the opening to anchor the block to the pillar.

IRA D. PERRY.